(12) United States Patent
Norton et al.

(10) Patent No.: US 10,633,993 B2
(45) Date of Patent: Apr. 28, 2020

(54) APPARATUS FOR INSERTION INTO A CAVITY OF AN OBJECT

(71) Applicant: ROLLS-ROYCE plc, London (GB)

(72) Inventors: Andrew D. Norton, Derby (GB); James Kell, Nottingham (GB); Adam G A Rushworth, Nottingham (GB); Amir Rabani, Nottingham (GB)

(73) Assignee: ROLLS-ROYCE plc, London (GB)

( * ) Notice: Subject to any disclaimer, the term of this patent is extended or adjusted under 35 U.S.C. 154(b) by 275 days.

(21) Appl. No.: 15/673,926

(22) Filed: Aug. 10, 2017

(65) Prior Publication Data

US 2018/0058233 A1 Mar. 1, 2018

(30) Foreign Application Priority Data

Aug. 26, 2016 (GB) .................................. 1614554.2

(51) Int. Cl.
| | | |
|---|---|---|
| *F01D 25/24* | (2006.01) | |
| *F01D 11/00* | (2006.01) | |
| *G01N 21/954* | (2006.01) | |
| *G02B 23/24* | (2006.01) | |
| *G01M 15/14* | (2006.01) | |

(Continued)

(52) U.S. Cl.
CPC .......... *F01D 11/003* (2013.01); *F01D 21/003* (2013.01); *F01D 25/24* (2013.01); *G01M 15/14* (2013.01); *G01N 21/954* (2013.01); *G02B 23/2476* (2013.01); *G02B 23/26* (2013.01); *F05D 2220/32* (2013.01);
(Continued)

(58) Field of Classification Search
None
See application file for complete search history.

(56) References Cited

U.S. PATENT DOCUMENTS

| | | | | |
|---|---|---|---|---|
| 4,108,239 A | * | 8/1978 | Fries | ..................... F28D 15/046 165/104.26 |
| 4,300,774 A | | 11/1981 | Hollis et al. | |

(Continued)

FOREIGN PATENT DOCUMENTS

| | | |
|---|---|---|
| CA | 1277230 | 12/1990 |
| EP | 2833189 | 2/2015 |

(Continued)

OTHER PUBLICATIONS

Great Britian Search Report dated Feb. 14, 2017, issued in GB Patent Application No. 1614554.2.

(Continued)

*Primary Examiner* — Michael Lebentritt
(74) *Attorney, Agent, or Firm* — Shumaker & Sieffert, P.A.

(57) ABSTRACT

Apparatus for insertion into a cavity of an object, the apparatus comprising: a first tube comprising a first end, a second end, a first cavity extending between the first end and the second end, and an aperture at the second end; a member positioned within the first cavity of the first tube and adjacent the aperture of the first tube, the member being configured to enable an action to be performed; a plug coupled to the second end of the first tube; and an actuator configured to move the first tube relative to the object between a first position in which the plug seals the member from the cavity of the object, and a second position in which the member is exposed to the cavity of the object.

18 Claims, 7 Drawing Sheets

(51) Int. Cl.
  *G02B 23/26* (2006.01)
  *F01D 21/00* (2006.01)
  *G01N 21/85* (2006.01)

(52) U.S. Cl.
  CPC .. *F05D 2260/83* (2013.01); *F05D 2270/8041* (2013.01); *G01N 21/8507* (2013.01)

(56) References Cited

U.S. PATENT DOCUMENTS

| | | | | |
|---|---|---|---|---|
| 4,461,343 | A | * | 7/1984 | Token ................ F28D 15/0233 165/104.26 |
| 5,317,607 | A | | 5/1994 | Formanek |
| 5,575,754 | A | | 11/1996 | Konomura |
| 6,091,489 | A | * | 7/2000 | Welker ............... G02B 23/2407 356/241.1 |
| 6,233,937 | B1 | * | 5/2001 | Gray ................... F01K 13/025 415/116 |
| 6,259,523 | B1 | | 7/2001 | Welker |
| 6,749,395 | B1 | * | 6/2004 | Reichert ................ F01D 17/14 415/115 |
| 8,015,788 | B2 | * | 9/2011 | Stephenson ............ F01D 5/046 415/114 |
| 8,397,516 | B2 | * | 3/2013 | Maldonado ............ F01D 9/041 415/115 |
| 9,797,310 | B2 | * | 10/2017 | Ekanayake ............ F01K 23/02 |
| 9,909,448 | B2 | * | 3/2018 | Gerstler ................ F01D 9/041 |
| 2006/0140754 | A1 | | 6/2006 | Tanioka |
| 2007/0084587 | A1 | * | 4/2007 | Huang ................. B22F 5/106 165/104.26 |
| 2007/0240854 | A1 | * | 10/2007 | Liu ....................... F28D 15/046 165/104.26 |
| 2007/0277963 | A1 | * | 12/2007 | Hou ..................... F28D 15/046 165/104.26 |
| 2009/0076332 | A1 | * | 3/2009 | Iwasaki ............... A61B 1/00096 600/168 |
| 2012/0227925 | A1 | * | 9/2012 | Sweeney ................ F01K 3/186 165/10 |
| 2013/0126139 | A1 | * | 5/2013 | Tsuruta ............... F28D 15/0233 165/170 |
| 2013/0168052 | A1 | * | 7/2013 | Meyer, IV ................ B32B 5/16 165/104.26 |
| 2013/0247540 | A1 | | 9/2013 | Kell et al. |
| 2013/0259646 | A1 | | 10/2013 | Feindel et al. |
| 2013/0330168 | A1 | * | 12/2013 | Liotta ................... F01D 17/085 415/1 |
| 2014/0034848 | A1 | * | 2/2014 | Campbell .............. F03G 6/00 250/492.1 |
| 2014/0063227 | A1 | * | 3/2014 | Baleine ............. G02B 23/2492 348/82 |
| 2015/0036127 | A1 | | 2/2015 | Konomura et al. |
| 2015/0300260 | A1 | * | 10/2015 | Wollenweber .......... F23K 5/005 60/39.12 |
| 2017/0314871 | A1 | * | 11/2017 | Basu ................... H01L 21/4871 |
| 2018/0058233 | A1 | * | 3/2018 | Norton ................. F01D 11/003 |

FOREIGN PATENT DOCUMENTS

| | | |
|---|---|---|
| FR | 2708072 | 1/1995 |
| FR | 2972053 | 8/2012 |

OTHER PUBLICATIONS

European Search Report dated Jan. 3, 2018, issued in EP Patent Application No. 17183445.

Response to Extended Search Report dated Jan. 11, 2018, from counterpart European Application No. 17183445.0, filed Aug. 20, 2018, 7 pp.

\* cited by examiner

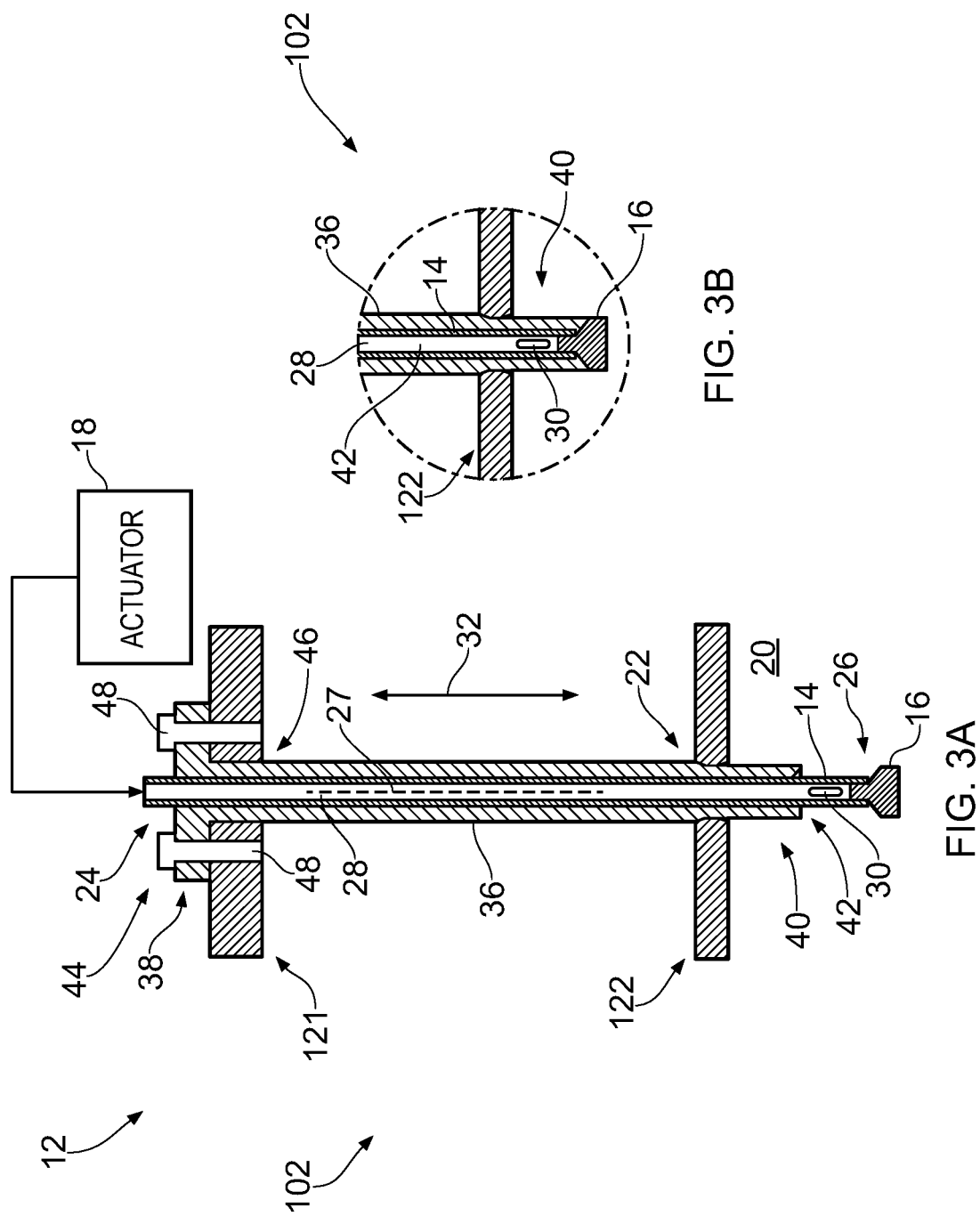

APPARATUS FOR INSERTION INTO A CAVITY OF AN OBJECT

CROSS-REFERENCE TO RELATED APPLICATIONS

This application is based upon and claims the benefit of priority from British Patent Application Number 1614554.2 filed 26 Aug. 2016, the entire contents of which are incorporated by reference.

FIELD OF DISCLOSURE

The present disclosure concerns apparatus for insertion into a cavity of an object.

BACKGROUND

Gas turbine engines may sustain wear and/or damage during operation that may reduce the efficiency of the gas turbine engine. Inspection and repair of a gas turbine engine may be a relatively time consuming task and may require disassembly of the gas turbine engine. For example, gas turbine engines used in aviation are usually mounted on a wing of an aircraft. Inspection and repair of such a gas turbine engine may require the gas turbine engine to be removed from the wing of the aircraft and then disassembled to allow access to the worn and/or damaged component.

BRIEF SUMMARY

According to various examples there is provided apparatus for insertion into a cavity of an object, the apparatus comprising: a first tube comprising a first end, a second end, a first cavity extending between the first end and the second end, and an aperture; a plug coupled to the second end of the first tube; and an actuator configured to move the first tube relative to the object between a first position in which the plug seals the aperture from the cavity of the object, and a second position in which the aperture is exposed to the cavity of the object.

The apparatus may further comprise a second tube including a first end, a second end, and a second cavity extending between the first end and the second end. The first tube may be positioned within the second cavity of the second tube. The actuator may be configured to move the first tube relative to the second tube.

The plug may form a seal with the second end of the second tube when the first tube is at the first position. The aperture of the first tube may be positioned external to the second tube when the first tube is at the second position.

The apparatus may further comprise a connector arrangement configured to connect the apparatus to the object.

The connector arrangement may be configured to enable an operator to connect the apparatus to the object. The connector arrangement may be configured to enable an operator to disconnect and remove the apparatus from the object.

The first tube may be hollow and may have another aperture at the first end of the first tube. The apparatus may be configured to function as a valve to control a flow of fluid to or from the cavity of the object.

The apparatus may further comprise a member positioned within the first cavity of the first tube and adjacent the aperture of the first tube. The member may be configured to enable an action to be performed.

The member may comprise one or more optical fibres. The apparatus may further comprise an optical sensor coupled to the one or more optical fibres, The optical sensor may be positioned external to the first tube.

The member may comprise an optical sensor, and the optical sensor may be positioned internal to the first tube. The optical sensor may be positioned adjacent the aperture of the first tube.

The member may comprise repair apparatus for performing a repair on the object.

The member may comprise non-destructive examination (NDE) apparatus.

The aperture may be located at the second end of the first tube.

The object may be a gas turbine engine.

The cavity may be a gas path of the gas turbine engine.

According to various examples there is provided apparatus for insertion into a cavity of an object, the apparatus comprising: a first tube comprising a first end and a second end; a plug coupled to the second end of the first tube; a member coupled to the first tube and configured to enable an action to be performed; and an actuator configured to move the first tube relative to the object between a first position in which the plug seals the member from the cavity of the object, and a second position in which the member is exposed to the cavity of the object.

According to various examples there is provided a system comprising: a gas turbine engine including a first inspection port; and an apparatus as described in any of the preceding paragraphs extending inside the first inspection port.

The gas turbine engine may further comprise a second inspection port, and the system may further comprise another apparatus as described in any of the preceding paragraphs extending inside the second inspection port.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF DRAWINGS

Embodiments will now be described by way of example only, with reference to the Figures, in which:

FIG. 3A illustrates a schematic side view of a further apparatus and an object according to various examples;

FIG. 3B illustrates a further schematic side view of the apparatus and the object of FIG. 3A;

DETAILED DESCRIPTION

Figure 1:
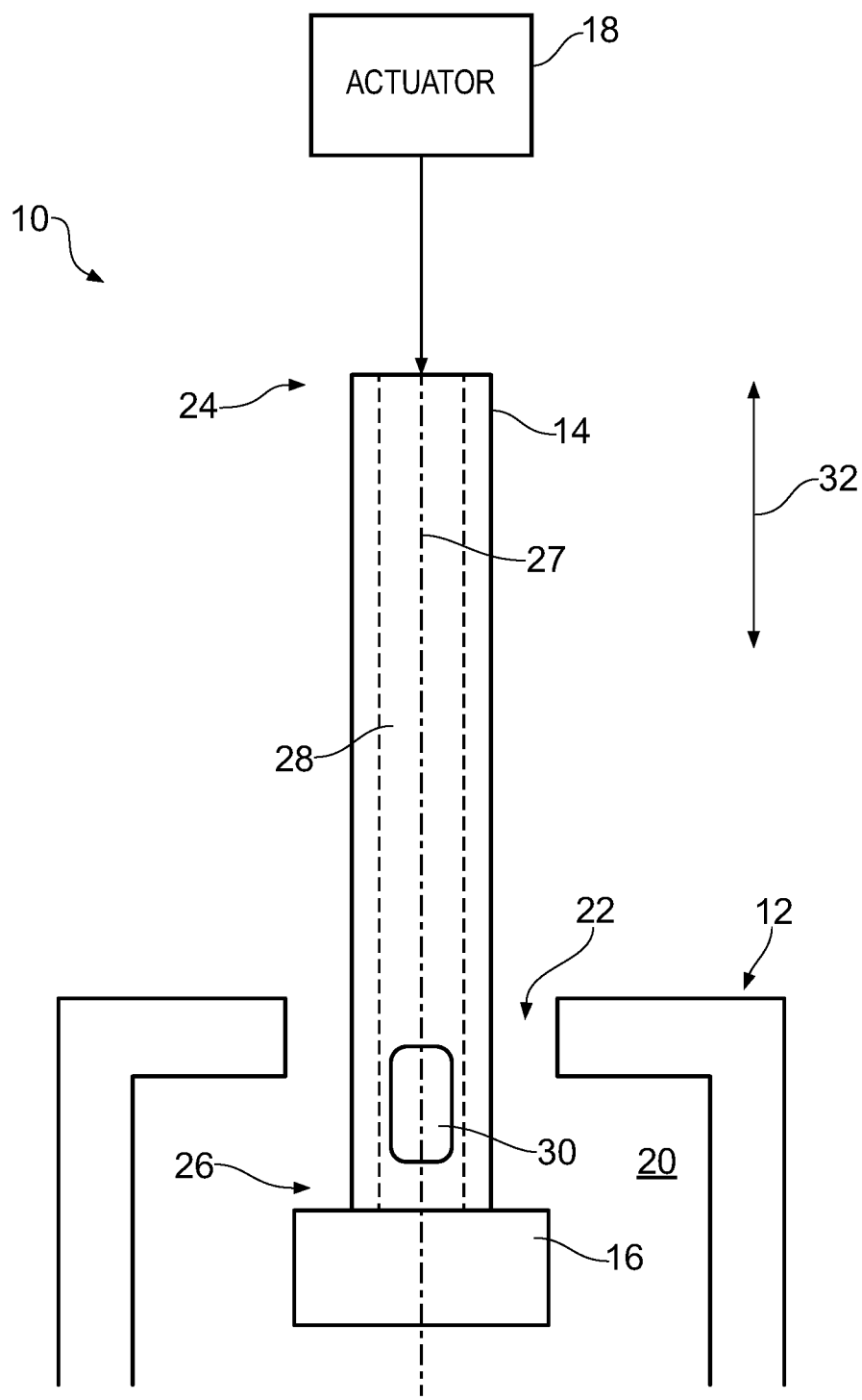
FIG. 1 illustrates a schematic side view of apparatus for insertion into a cavity of an object according to various examples.

FIG. 1 illustrates a schematic side view of apparatus 10 and an object 12 according to various examples. The apparatus 10 includes a first tube 14, a plug 16 and an actuator 18.

The object 12 may be any article, module, component, part, or assembly of components that define a cavity 20 and an opening 22 to the cavity 20. For example, the object 12 may be a gas turbine engine or a module of a gas turbine engine. In a further example, the object 12 may be an internal combustion engine for a vehicle. Alternatively, the object 12 may be a pipeline, a storage tank, or other container. Where the object 12 is a gas turbine engine, or a module of a gas turbine engine, the opening 22 may be a borescope port and the cavity 20 may be a gas path within the gas turbine engine.

In summary, the apparatus 10 may be inserted into the cavity 20 of the object 12 via the opening 22 to enable an inspection, a repair activity, or a non-destructive examination to be performed. Alternatively, the apparatus 10 may be inserted into the cavity 20 of the object 12 via the opening 22 to function as a valve.

The first tube 14 extends along a longitudinal axis 27 and includes a first end 24 a second opposite end 26. The first tube 14 may have any suitable cross sectional shape and may have, for example, a circular, elliptical, or a polygonal cross sectional shape. The first tube 14 also includes a first cavity 28 that extends between the first end 24 and the second end 26 along the longitudinal axis 27. In some examples, the first cavity 28 extends from the first end 24 to the second end 26 and the first end 24 and the second end 26 may be open. In other examples, the first cavity 28 has a length along the longitudinal axis 27 that is less than the length of the first tube 14 along the longitudinal axis 27 and consequently, the first end 24 and/or the second end 26 may be closed.

The first tube 14 also includes an aperture 30 that provides an opening to the cavity 28. The aperture 30 may have any suitable shape and may be circular, elliptical or have a polygonal shape for example. The aperture 30 may be located at the second end 26 of the first tube 14 as illustrated in FIG. 1. In other examples, the aperture 30 may be located at any position between the first end 24 and the second end 26. The aperture 30 may be an open aperture or may be covered by a material that is transparent to electromagnetic waves within one or more portions of the electromagnetic spectrum. For example, the aperture 30 may be covered by glass that is transparent to light.

The plug 16 is coupled to the second end 26 of the first tube 14. For example, the plug 16 may be coupled to the second end 26 via an adhesive. In another example, the plug 16 may be welded to the first tube 14. In a further example, the plug 16 may be integral with the first tube 14 and may define the second end 26 of the first tube 14.

The plug 16 may be sized and shaped to plug the opening 22 of the object 12 and thereby seal the cavity 20. For example, where the object 12 is a gas turbine engine and the opening 22 is a borescope port, the plug 16 may be sized and shaped to plug the borescope port and thereby seal the gas path within the gas turbine engine.

The actuator 18 may include any suitable device for moving the first tube 14 relative to the object 12. For example, the actuator 18 may include a servo-motor, a hydraulic cylinder, a pneumatic cylinder, a rack and pinion, a cam rotatable on a shaft, or a lead screw. The actuator 18 is configured to move the first tube 14 relative to the object 12 and parallel to the longitudinal axis 27 as indicated by arrow 32. The actuator 18 is configured to move the first tube 14 between a first position in which the plug 16 seals the aperture 30 from the cavity 20 of the object 12, and a second position in which the aperture 30 is exposed to the cavity 20 of the object 12 (as illustrated in FIG. 1).

The apparatus 10 may receive a member in the first cavity 28 for enabling one or more actions to be performed, and this is described in greater detail in the following paragraphs with reference to FIGS. 2 and 4. Alternatively, the first cavity 28 of the first tube 14 may be hollow and where the first end 24 of the first tube 14 is open (that is, the first tube 14 has another aperture at the first end 24), the apparatus 10 may be configured to function as a valve to control a flow of fluid to or from the cavity 20 of the object 12. In particular, fluid within the cavity 20 may ingress the first tube 14 at the aperture 30 and then egress the first tube 14 at the open first end 24. Similarly, fluid outside of the cavity 20 may ingress the first tube 14 at the open first end 24 and then egress the first tube 14 at the aperture 30 into the cavity 20 of the object 12.

Figure 2A:
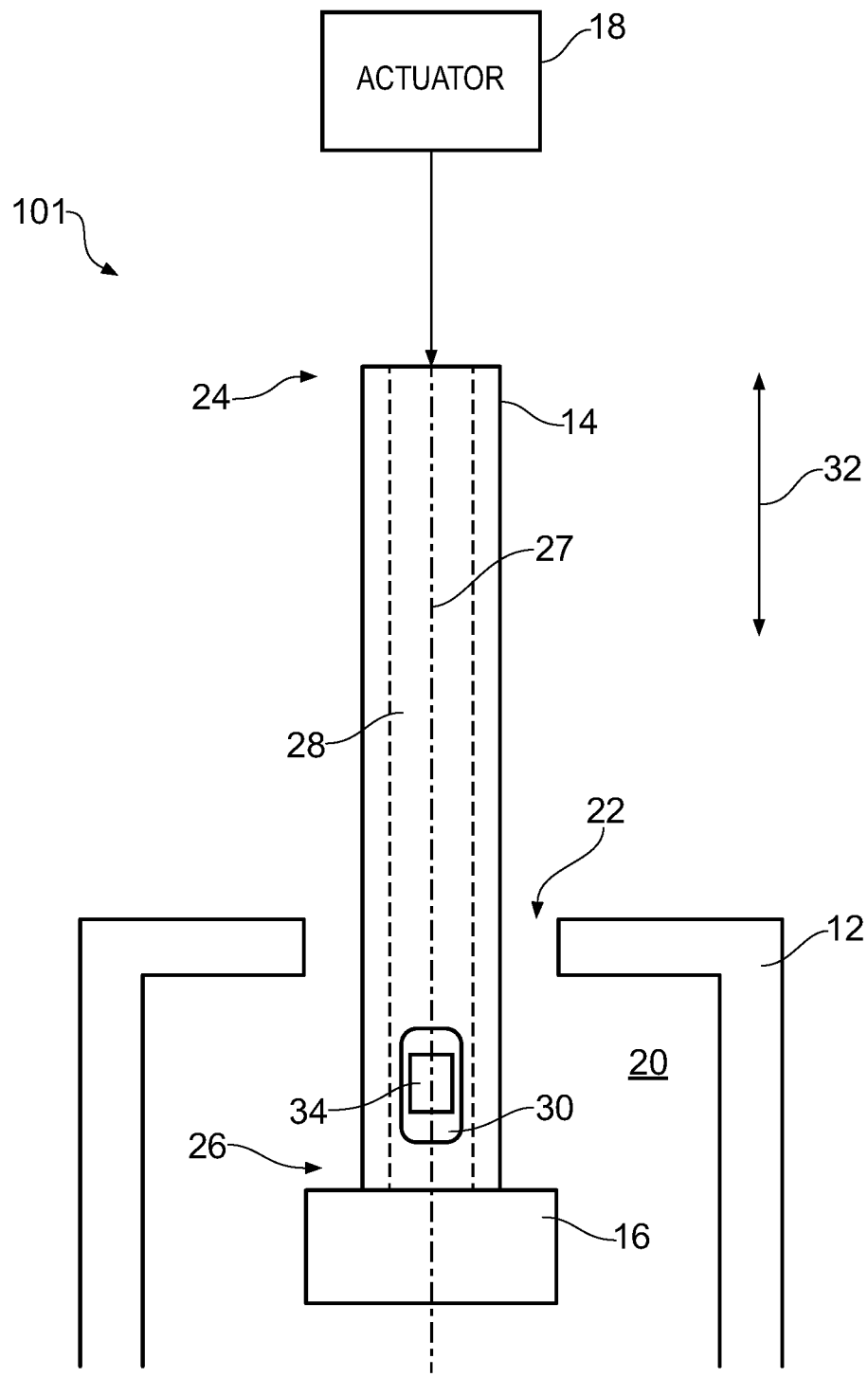
FIG. 2A illustrates a schematic side view of another apparatus for insertion into a cavity of an object according to various examples.
Figure 2B:
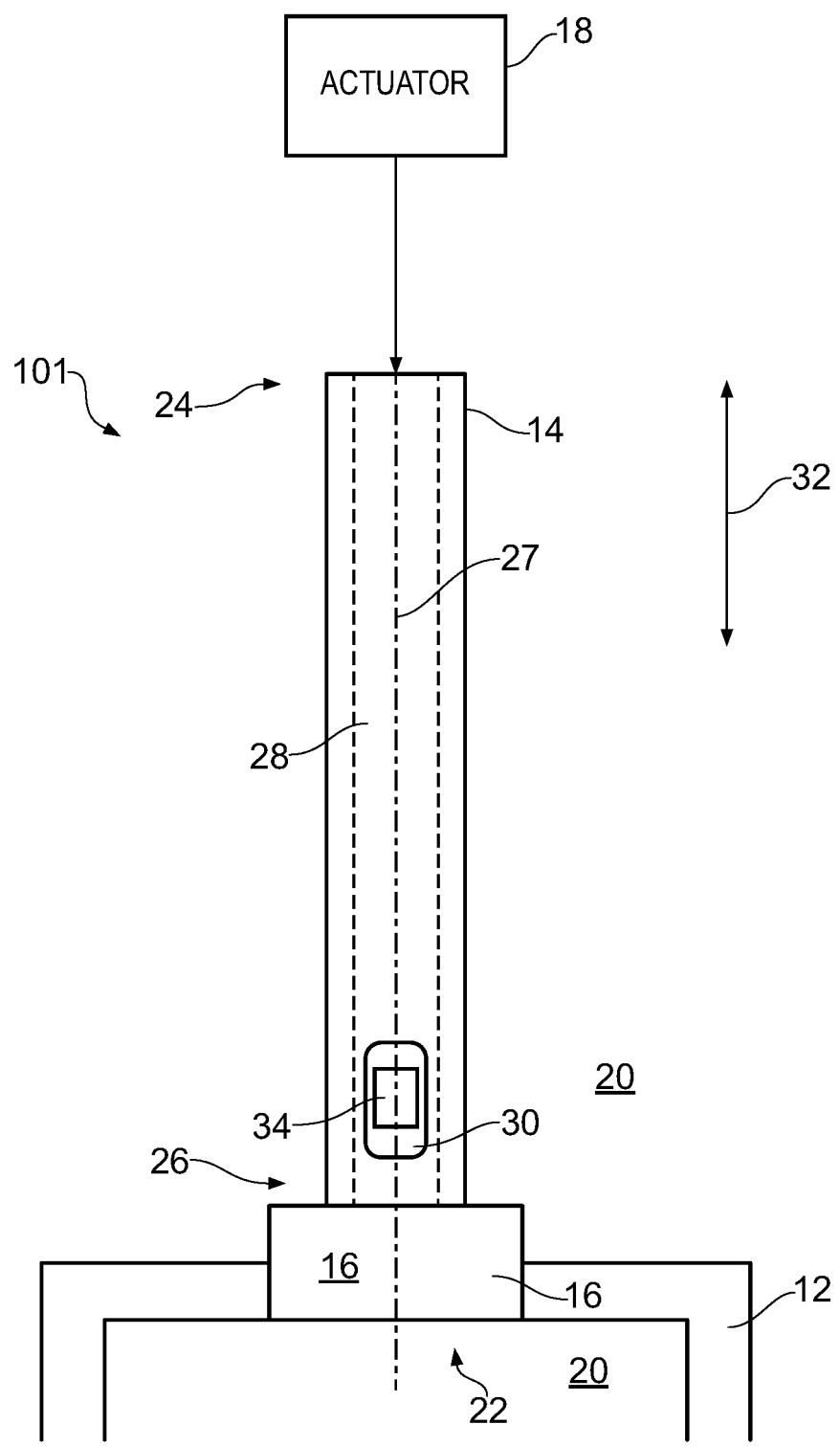
FIG. 2B illustrates a further schematic side view of the apparatus of FIG. 2A.

FIGS. 2A and 2B illustrate a schematic side view of another apparatus 101 and an object 12. The apparatus 101 and the object 12 are similar to the apparatus 10 and the object 12 illustrated in FIG. 1 respectively, and where the features are similar, the same reference numerals are used.

The apparatus 101 differs from the apparatus 10 in that the apparatus 101 further comprises a member 34 positioned within the first cavity 28 of the first tube 14 and adjacent the aperture 30 of the first tube 14. In some examples, the member 34 may completely cover the aperture 30 (and may or may not seal the aperture 30). In other examples, the member 34 may only partially cover the aperture 30.

FIG. 2A illustrates the first tube 14 in the second position in which the aperture 30 is exposed to the cavity 20 of the object 12. FIG. 2B illustrates the first tube 14 in the first position in which the plug 16 seals the aperture 30 from the cavity 20 of the object 12.

The member 34 is configured to enable one or more actions to be performed. The actions may include (but are not limited to) an inspection activity, and/or a repair activity, and/or a machining activity.

The member 34 may comprise inspection apparatus for enabling the interior of the object 12 to be inspected by a human operator and/or a computer. The member 34 may comprise one or more optical fibres to enable electromagnetic waves to be transmitted from the aperture 30 and/or to enable electromagnetic waves to be received via the aperture 30. The apparatus 101 may further comprise an optical sensor (such as a charge coupled device (CCD) camera, or a complementary metal oxide semiconductor (CMOS) camera) coupled to the one or more optical fibres. The optical sensor may be positioned external to the first tube 14 or may be positioned internal to the first tube 14. Additionally or alternatively, the apparatus 101 may comprise a device for emitting electromagnetic waves (such as a laser, a light emitting diode, a halogen bulb for example) that is coupled to the one or more optical fibres. The device for emitting electromagnetic waves may be positioned external to the first tube 14 or may be positioned internal to the first tube 14.

Additionally or alternatively, the member 34 may comprise repair apparatus for performing a repair on the object 12. For example, the apparatus 34 may comprise one or more optical fibres and a laser as described in the preceding paragraph to enable the apparatus 10 to clean the object 12 or to drill the object 12. In another example, the member 34 may comprise one or more nozzles for spraying a coating on the object 12. In a further example, the member 34 may comprise one or more nozzles and a pump for extracting fluid from the cavity 20 of the object 12 (for example, to create a vacuum in the cavity 20). In another example, the member 34 may comprise a machine tool such as a milling tool or a drill.

Additionally or alternatively, the member 34 may comprise non-destructive examination (NDE) apparatus (which may also be referred to as non-destructive testing (NDT) apparatus). For example, the member 34 may comprise one or more optical fibres, a sensor (as described above) and a computer for enabling non-destructive examination to be performed. In another example, the member 34 may comprise an ultrasonic transducer and a computer for enabling non-destructive examination to be performed. In a further example, the member 34 may comprise infrared and thermal testing apparatus for enabling non-destructive examination to be performed. It should be appreciated that the member 34 may comprise any suitable non-destructive examination apparatus and is not limited to the examples provided above.

FIGS. 3A and 3B illustrate a schematic side view of a further apparatus 102 and an object 12 according to various examples. The apparatus 102 and the object 12 are similar to the apparatus 10 and the object 12 respectively, and where the features are similar, the same reference numerals are used.

The apparatus 102 differs from the apparatus 10 in that the apparatus 102 further comprises a second tube 36 including a first end 38 and a second opposite end 40. The second tube 36 is T shaped when viewed from the side (as illustrated in FIG. 3A) and consequently includes a first part (at the first end 38) that extends perpendicular to the longitudinal axis 27, and a second part that extends parallel to the longitudinal axis 27. The second tube 36 may have any suitable cross sectional shape and may have a circular cross sectional shape, an elliptical cross sectional shape or a polygonal cross sectional shape.

The second tube 36 defines a second cavity 42 that extends between the first end 38 and the second end 40 of the second tube 36. As illustrated in FIG. 3A, the first end 38 and the second end 40 are open. The first tube 14 is positioned within the second cavity 42 of the second tube 36. In some examples, the first tube 14 and the second tube 36 are arranged concentrically and share the longitudinal axis 27. In other examples, the first tube 14 and the second tube 36 are not arranged concentrically and consequently have separate longitudinal axes.

The object 12 includes a first wall 121 and a second wall 122 (which may be casing walls of a gas turbine engine for example). The first end 38 of the second tube 36 extends through an opening 46 in the first wall 121 and the second end 40 of the second tube 36 extends through an opening 22 in the second wall 122.

The apparatus 102 includes a connector arrangement 44 that is configured to connect the apparatus 102 to the object 12. In some examples, the connector arrangement 44 comprises a plurality of fasteners 48 (such as screws or bolts) that extend through the first end 38 of the second tube 36 and into the first wall 121. In other examples, the connector arrangement 44 may include an alternative mechanism for connecting the apparatus 102 to the object 12 and may include an adhesive for example. Consequently, the second tube 36 may be fixed to the first wall 121 and be static relative to the first wall 121.

The actuator 18 is configured to move the first tube 14 relative to the second tube 36 and relative to the object 12 between a first position and a second position.

When the first tube 14 is located at the first position (as illustrated in FIG. 3B), the aperture 30 is positioned within the cavity 42 of the second tube 36 and the plug 16 forms a seal with the second end 40 of the second tube 36. Consequently, the aperture 30 is sealed from the cavity 20 of the object 12 by the plug 16 and the second end 40 of the second tube 36.

When the first tube 14 is located at the second position (as illustrated in FIG. 3A), the plug 16 is positioned remote from the second end 40 of the second tube 36 and the aperture 30 of the first tube 14 is positioned external to the second tube 36. Consequently, the aperture 30 is exposed to the cavity 20 and the first tube 14 extends further into the cavity 20 than when the first tube 14 is at the first position.

The apparatus 102 may receive a member for enabling an action to be performed and this is described in greater detail in the following paragraphs with reference to FIG. 4. Alternatively, the apparatus 102 may function as a valve as described above with reference to FIG. 1.

Figure 4:
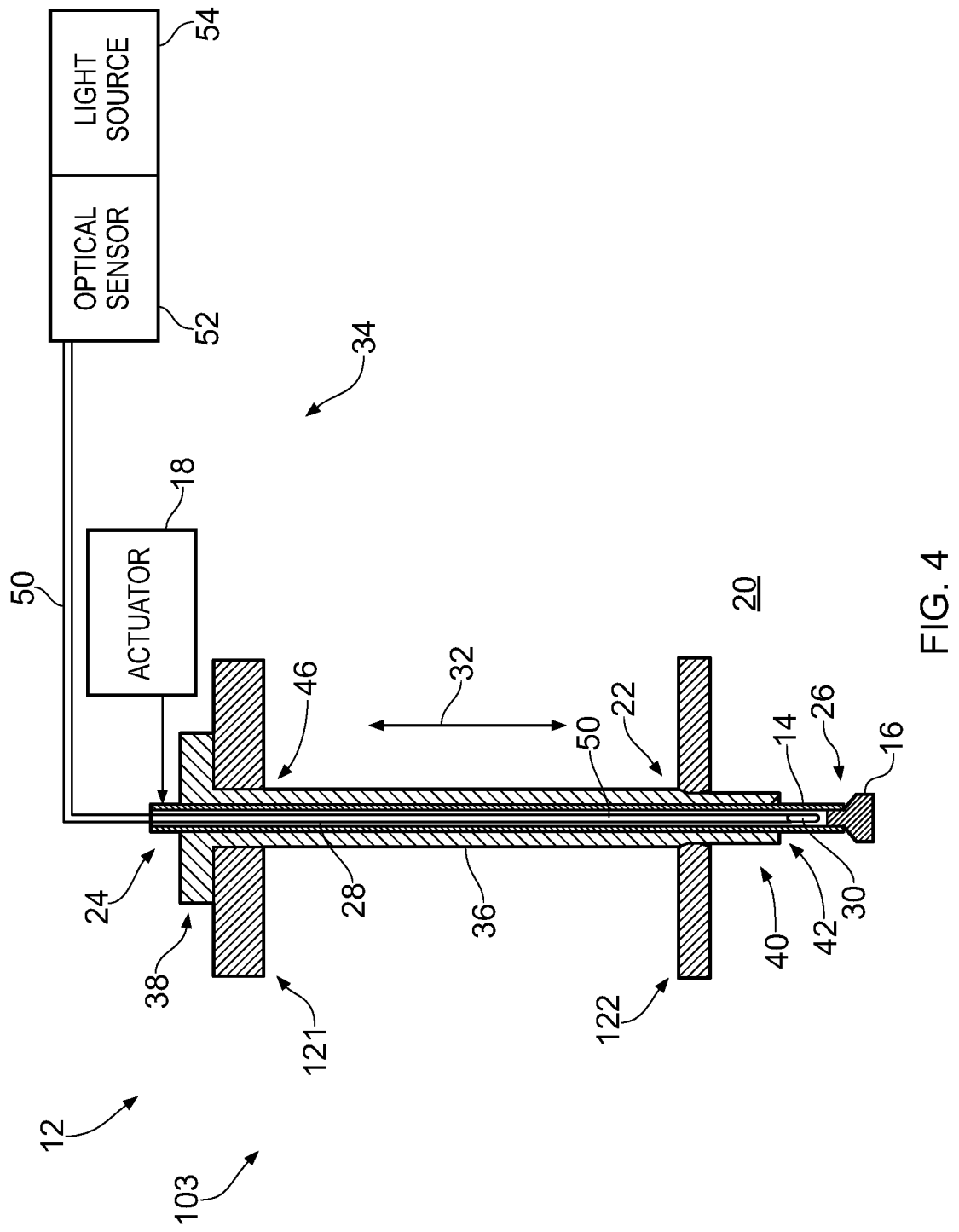
FIG. 4 illustrates a schematic side view of another apparatus and an object according to various examples.

FIG. 4 illustrates a schematic side view of another apparatus 103 and an object 12 according to various examples. The apparatus 103 is similar to the apparatus 102 and where the features are similar, the same reference numerals are used. The apparatus 103 differs from the apparatus 102 in that the apparatus 103 further comprises a member 34 including a plurality of optical fibres 50, an optical sensor 52 and a light source 54.

The plurality of optical fibres 50 have a first end positioned at the aperture 30 of the first tube 14, and a second end connected to the optical sensor 52 and the light source 54. The optical sensor 52 and the light source 54 are positioned externally of the first tube 14 and consequently, the plurality of optical fibres 50 include a first part that extends along the length of the first tube 14 within the first cavity 28 between the aperture 30 and the first end 24 of the first tube 14, and a second part that extends from the first end 24 of the first tube 14 to the optical sensor 52 and the light source 54.

The optical sensor 52 may be any suitable optical sensor 52 and may be a charge coupled device (CCD) camera or a complementary metal oxide semiconductor (CMOS) camera for example. While the optical sensor 52 is illustrated as being positioned external to the first tube 14 in FIG. 4, it should be appreciated that in other examples, the optical sensor 52 may be positioned within the first cavity 28 of the first tube 14. For example, the optical sensor 52 may be positioned at the aperture 30 of the first tube 14.

The light source 54 may be any suitable emitter of visible light and may comprise a light emitting diode or a laser. In some examples, the light source 54 may be configured to emit infrared radiation or ultraviolet radiation. While the light source 54 is illustrated as being positioned external to the first tube 14 in FIG. 4, it should be appreciated that in other examples, the light source 54 may be positioned within the first cavity 28 of the first tube 14.

In operation, the light source 54 is configured to emit light which is conveyed to the aperture 30 of the first tube 14 via the plurality of optical fibres 50. At the aperture 30, the plurality of optical fibres 50 direct the light out of the aperture 30 and into the cavity 20 of the object 12. The light is then reflected by the surfaces of the object 12 and some of the reflected light is received at the aperture 30 which is conveyed to the optical sensor 52 via the plurality of optical fibres 50.

The apparatus 10, 101, 102, 103 may provide several advantages. First, the apparatus 10, 102 may function as a valve for enabling fluid to be removed from, or provided to, the cavity 20 of the object 12. Second, the apparatus 101, 103 (which includes the member 34) enables an action (such as inspection, repair, non-destructive examination) to be performed within the cavity 20 of the object 12. Third, the plug 16 may provide an effective seal with the object 12 (as illustrated in FIGS. 1 and 2) or with the second tube 36 and may consequently protect the member 34 from being damaged by fluids within the cavity 20 of the object 12. Fourth, the plug 16 may be sized and dimensioned to fit snugly inside the opening 22 of the object 12 and consequently, the object 12 may not require modification to be used with the apparatus 10, 101, 102, 103. Fifth, the plug 16 may not comprise any movable mechanical parts and consequently, the plug 16 may be relatively simple and may be less likely to fail during operation. Sixth, the remote positioning of a sensor from the first tube 14 (such as the optical sensor 52 and the first tube 14 illustrated in FIG. 4) may provide more space for the sensor and thereby allow the sensor to have a larger sensor area with a higher resolution.

Figure 5:
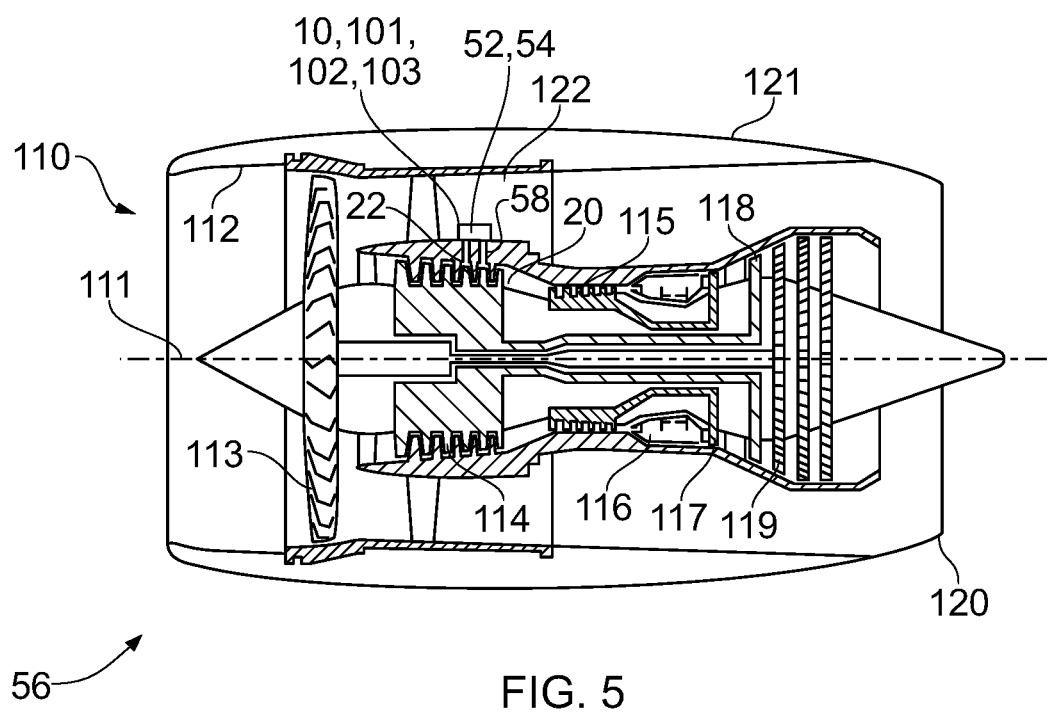
FIG. 5 illustrates a schematic cross sectional side view of a gas turbine engine and an apparatus according to various examples.

FIG. 5 illustrates a schematic cross sectional side view of a system 56 comprising: a gas turbine engine 110 including a first inspection port 22; and an apparatus 10, 101, 102, 103 as described in the preceding paragraphs extending inside the first inspection port 22. The gas turbine engine 110 (or a module of the gas turbine engine 110) may be considered to be the object 12 described in the preceding paragraphs.

The gas turbine engine 110 has a principal and rotational axis 111 (which may be perpendicular to the longitudinal axis 27 of the apparatus 10, 101, 102, 103).

The gas turbine engine 110 comprises, in axial flow series, an air intake 112, a propulsive fan 113, an intermediate pressure compressor 114, a high-pressure compressor 115, combustion equipment 116, a high-pressure turbine 117, an intermediate pressure turbine 118, a low-pressure turbine 119 and an exhaust nozzle 120. A nacelle 121 generally surrounds the engine 110 and defines both the intake 112 and the exhaust nozzle 120.

The gas turbine engine 110 operates so that air entering the intake 112 is accelerated by the fan 113 to produce two air flows: a first air flow into the intermediate pressure compressor 114 and a second air flow which passes through a bypass duct 122 to provide propulsive thrust. The intermediate pressure compressor 114 compresses the air flow directed into it before delivering that air to the high pressure compressor 115 where further compression takes place.

The compressed air exhausted from the high-pressure compressor 115 is directed into the combustion equipment 116 where it is mixed with fuel and the mixture combusted. The resultant hot combustion products then expand through, and thereby drive the high, intermediate and low-pressure turbines 117, 118, 119 before being exhausted through the nozzle 120 to provide additional propulsive thrust. The high 117, intermediate 118 and low 119 pressure turbines drive respectively the high pressure compressor 115, intermediate pressure compressor 114 and fan 113, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Furthermore, the gas turbine engine may comprise a gearbox provided in the drive train from a turbine to a compressor and/or fan.

The first inspection port 22 is a borescope port through the casing of the intermediate pressure compressor 114 and the cavity 20 is the gas path within the intermediate pressure compressor 114. In some examples, the gas turbine engine 110 may further comprise a second inspection port 58 (for example, another borescope port through the casing of the intermediate pressure compressor 114), and the system 56 further comprises another apparatus 10, 101, 102, 103 as described in the preceding paragraphs extending inside the second inspection port 58.

Part of the member 34 (such as the optical sensor 52 and the light source 54 for example) may be mounted to (or embedded within) the external surface of the casing of the intermediate pressure compressor 114. This may advantageously enable components that may be damaged by high temperatures (such as the optical sensor 52) to be positioned remote from the gas path 20 and in a region that experiences lower operating temperatures.

It will be understood that the invention is not limited to the embodiments above-described and various modifications and improvements can be made without departing from the concepts described herein. For example, the first tube 14 (and the second tube 36 in the examples illustrated in FIGS. 2 and 4) may not be straight and may instead be curved.

Figure 6:
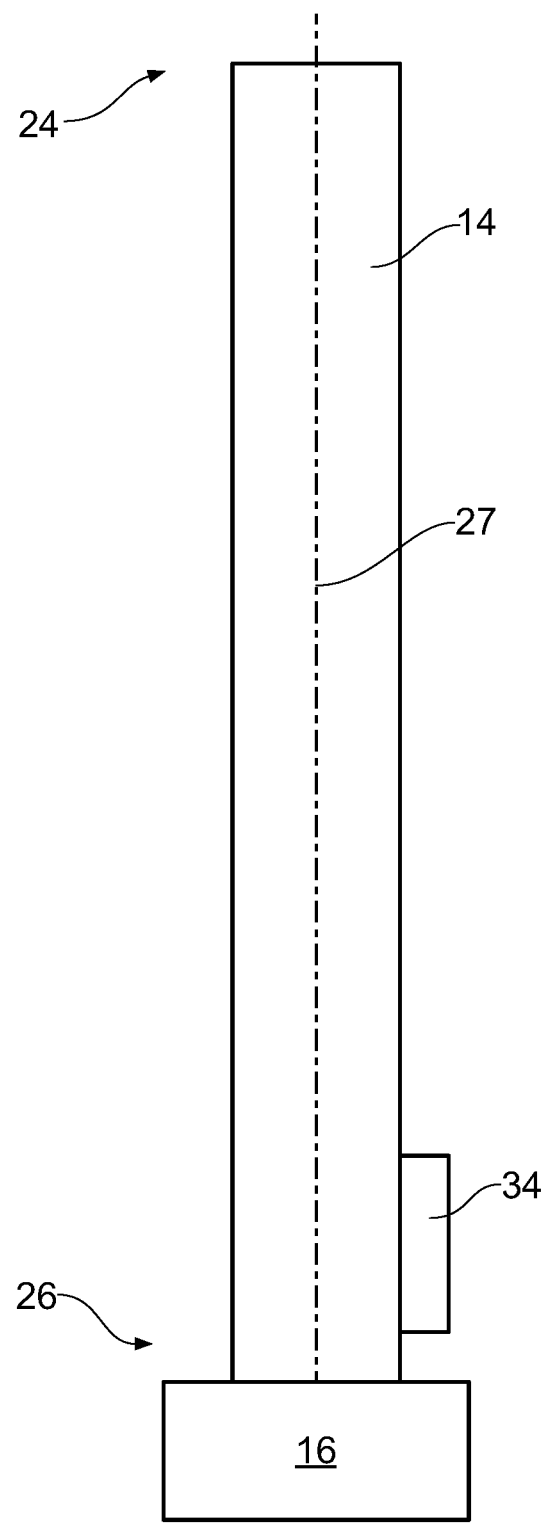
FIG. 6 illustrates a schematic side view of a first tube according to various examples.

In another example, as illustrated in FIG. 6, the first tube 14 may not be hollow (that is, the first tube 14 may not define the first cavity 38 and may be solid), and the member 34 may be coupled to the exterior surface of the first tube 14.

Except where mutually exclusive, any of the features may be employed separately or in combination with any other features and the disclosure extends to and includes all combinations and sub-combinations of one or more features described herein.

The invention claimed is:

1. Apparatus for insertion into a cavity of an object, the apparatus comprising:
    a first tube comprising a first end, a second end, a first cavity extending between the first end and the second end, and an aperture;
    a plug coupled to the second end of the first tube; and
    an actuator configured to move the first tube relative to the object between a first position in which the plug seals the aperture from the cavity of the object, and a second position in which the aperture is exposed to the cavity of the object.

2. Apparatus as claimed in claim 1, further comprising a second tube including
    a first end, a second end, and a second cavity extending between the first end and the second end, the first tube being positioned within the second cavity of the second tube, the actuator being configured to move the first tube relative to the second tube.

3. Apparatus as claimed in claim 2, wherein the plug forms a seal with the second end of the second tube when the first tube is at the first position, and the aperture of the first tube is positioned external to the second tube when the first tube is at the second position.

4. Apparatus as claimed in claim 1, further comprising a connector arrangement configured to connect the apparatus to the object.

5. Apparatus as claimed in claim 4, wherein the connector arrangement is configured to enable an operator to connect the apparatus to the object, and to enable an operator to disconnect and remove the apparatus from the object.

6. Apparatus as claimed in claim 1, wherein the first tube is hollow and has another aperture at the first end of the first tube, the apparatus being configured to function as a valve to control a flow of fluid to or from the cavity of the object.

7. Apparatus as claimed in claim 1, further comprising a member positioned within the first cavity of the first tube and adjacent the aperture of the first tube, the member being configured to enable an action to be performed.

8. Apparatus as claimed in claim 7, wherein the member comprises one or more optical fibres, and the apparatus further comprises an optical sensor coupled to the one or more optical fibres.

9. Apparatus as claimed in claim 8, wherein the optical sensor is positioned external to the first tube.

10. Apparatus as claimed in claim 7, wherein the member comprises an optical sensor.

11. Apparatus as claimed in claim 7, wherein the member comprises repair apparatus for performing a repair on the object.

12. Apparatus as claimed in claim 7, wherein the member comprises non-destructive examination (NDE) apparatus.

13. Apparatus as claimed in claim 1, where the aperture is located at the second end of the first tube.

14. Apparatus as claimed in claim 1, wherein the object is a gas turbine engine.

15. Apparatus as claimed in claim 14, wherein the cavity is a gas path of the gas turbine engine.

16. A system comprising: a gas turbine engine including a first inspection port; and an apparatus as claimed in claim 1 extending inside the first inspection port.

17. A system as claimed in claim 16, wherein the gas turbine engine further comprises a second inspection port, and the system further comprises another apparatus as claimed in claim 1 extending inside the second inspection port.

18. Apparatus for insertion into a cavity of an object, the apparatus comprising:
 a first tube comprising a first end and a second end;
 a plug coupled to the second end of the first tube;
 a member coupled to the first tube and configured to enable an action to be performed; and
 an actuator configured to move the first tube relative to the object between a first position in which the plug seals the member from the cavity of the object, and a second position in which the member is exposed to the cavity of the object.

* * * * *